Patented Feb. 6, 1934

1,945,542

UNITED STATES PATENT OFFICE 1,945,542

PARASITICIDE AND METHOD OF MAKING THE SAME

Max L. Tower and Harry W. Dye, Middleport, N. Y., assignor to Niagara Sprayer and Chemical Company, Inc., Middleport, N. Y., a corporation No Drawing. Application February 7, 1929
Serial No. 338,325

10 Claims. (Cl. 167—20)

This invention relates to parasiticidal compositions and more particularly to fungicides containing elementary sulphur as the principal toxic agent and to improved methods of preparing such materials. Among the principal objects of the invention is the provision of a material of this type which can be applied to the foliage of growing plants in sufficient amounts to protect the latter against the more commonly occurring forms of fungus diseases (and also in some instances against insect pests) without causing the foliage to assume an unsightly appearance due to the adherence of the parasiticidal material to the surface of the foliage.

This undesirable effect or discoloration of foliage is particularly objectionable in the case of ornamental cultivated roses when powdered sulphur or so-called sulphur dust has been applied to the foliage leaves to protect the plant against the attack of certain fungus diseases according to methods and practices well known to those skilled in this art, and in this instance the unsightly appearance of the foliage is due, we have found, to the contrast between the yellow or whitish yellow color of the adhering sulphur dust and the green color of the normal fresh foliage leaves of the rose plant.

The present invention largely or completely overcomes the foregoing difficulties by providing a parasiticide material, preferable in dust form comprising comminuted sulphur, the particles of which are partially or completely covered with a colored coating such that the powdered material as a whole possesses substantially the same appearance to the eye with respect to tint or hue as that of the normal foliage leaves of the plant to be treated with the material. In its preferred form the improved powdered colored sulphur product of the present invention possesses a tint or hue which produces no marked contrast or difference in color between the green color of the normal green foliage leaves of the golden Ophelia rose plant or varieties of roses which have leaves of similar color such as American Beauty, Hadley, Machin, or red Reliance, when the material is comminuted to a degree of fineness such that at least about 90 percent of it will pass through a 200 mesh screen and when it is dusted upon the foliage in the proportion of about 9 pounds per square foot of leaf surface.

Various other distinguishing characteristics, properties and advantages of the present invention will be more apparent from the following examples which illustrate various embodiments of the present invention, both with respect to the product itself and also as to the methods by which it is prepared. It will be understood, of course, that the present invention is not restricted to the specific details set forth in these examples but that various changes may be made therein without departing from the true scope as set forth in the appended claims.

*Example I*

One hundred pounds of sulphur is ground by any convenient means to a degree of fineness such that at least about 90 percent of it will pass through a sifting screen having approximately 200 meshes to the linear inch. This comminuted or powdered sulphur is now mixed dry with about 1 pound of casein, 10 pounds of bentonite clay, about .4 pounds of Malachite green, about ½ pound of phosphine and about ½ pound auramine, each of the added ingredients being in approximately the same depowdered form of approximately the same degree of fineness as the powdered sulphur. This mixture of powders is then moistened and masticated in the presence of about 65 pounds of water containing about ½ pound of concentrated solution of the ammonium hydroxide, a thick putty results after a thorough mixing of the ingredients, which is dried by heating to a temperature of about 95 to 100° C. in any convenient drying apparatus. Care is taken not to heat the mixture during the drying process to a temperature which would melt the sulphur. The dry product is now disintegrated by grinding in any convenient type of grinding apparatus such as the ball-mill or lug type grinding mill, until the resulting product is sufficiently fine so that at least about 90 percent will pass through a sifting screen having approximately 200 meshes to the linear inch.

We have found by careful tests that a product made in accordance with the preceding example possesses substantially the same fungicidal activity toward the more commonly occurring fungus diseases generally controlled by means of dusting sulphur, as the pure ground sulphur material itself, and we have also demonstrated by suitable tests that the improved green colored sulphur product made in accordance with the above procedure is not substantially more injurious to the plants treated than the standard ground dusting sulphur commonly employed for this purpose.

Another example of the method and product of the present invention is as follows:

Example II

To a batch of freshly precipitated lead arsenate weighing 100 pounds (formed by acting on 65 grams of litharge with 54.5 pounds of 75% arsenic acid, with addition of 1 cc. of 80% acetic acid in 300 cc. of water at about 60° C.) is added 10 lbs. of powdered gelatinous bentonite clay. After stirring vigorously about twenty minutes, the bentonite has all disintegrated, forming a thin gel in the water, and is in intimate contact with the suspended fine particles of lead arsenate. Now add .8 lbs. of phosphine, .1 lbs. of Victoria green, and .4 lbs of Bismarck brown, preferably but not necessarily previously dissolved in water. The colors may be added singly or together. The bentonite now adsorbs the dye, flocculates, and encloses the white particles of lead arsenate, so that the appearance of the whole mass is a greenish brown or snuff color. The sludge may be evaporated, or the product may be filtered from the nearly colorless mother liquor, and the cake dried and ground.

A product colored as in this example is particularly desirable as an insecticide for tobacco leaves, the appearance of which is depreciated by the use of ordinary white lead arsenate.

The process of this example is particularly of value because no water soluble arsenic is developed, which would burn the leaves.

It will be observed that in the preceding examples that in preparing the improved products of the present invention a dye-carrier is employed for applying the dye to the particles of the parasiticide and that this dye-carrier is of colloidal gelatinous nature, capable of being flocculated in relatively insoluble condition or irreversible gel by drying upon the surface of the particles of the parasiticide (sulphur or lead arsenate). Other similar colloidal gelatinous dye-carriers may be employed in place of the gelatinous clay specified in the examples, as for instance gelatine or glue, peat, a caseinate such as ammoniated casein, gum, Irish moss, gelatinous silicic acid, hydrated aluminum or iron oxide and the like. A suitable hardening or flocculating agent may be added to assist in the formation of a relatively insoluble irreversible gel as for instance a relatively small amount of an electrolyte in the case of bentonite or the hydrated metallic oxides or tannin or tannic acid in the case of the casein, etc.

We have also discovered that a colloidal dye-carrier of the suspensoid type as distinguished from the gelatinous or glue-like type may be employed in the place of bentonite. Examples of this type of colloidal dye-carrier are kaolin, finely divided anhydrous aluminum or iron oxide, and finely divided cellulose.

An essential characteristic of the dye-carrier for the purposes of the present invention, is that after precipitation or flocculation its particles (produced by drying or the flocculating action of the electrolyte) shall be smaller than the particles of the parasiticide to be colored. This is the sense in which the term covering or coating of the particles of the parasiticide is employed in the present specifications and claims. In some instances the particles of the colored dye-carrier are visible under the microscope under a magnification from 100 to 1000 diameters. In other instances, particularly where a gelatinous type of colloidal dye-carrier is employed, the particles of the dye-carrier are not visible under a microscope at the magnification specified but the particles of the comminuted parasiticide appear to be uniformly covered with a smooth colored coating.

Or in other words we believe in these instances that the particles of the dye-carrier are so small as to be invisible at these magnifications.

In order to obtain different colors or different shades of the same color it will be obvious of course that different combinations of dye may be employed to produce the desired tint or hue and depth of color. The basic coal tar dyes are preferred for the reason that the colloidal dye-carriers mentioned are more readily colored by this class of dyes than with other dyes. However, other dyes such as natural dyes may be employed with fairly satisfactory results and also we have found that the color of the finished product may be varied by incorporating suitable inorganic pigments such as lead chromate or Prussian blue and the like with the dye or these inorganic color pigments may be employed alone. When inorganic pigments are used it is preferred to precipitate these in situ in intimate contact with the dye-carrier and the comminuted parasiticide in water suspension in accordance with the methods which will be obvious to those skilled in this art.

We are aware that previous attempts have been made to color various parasiticides by means of dyes, pigments and the like by direct application of such colored materials to the comminuted parasiticide but these methods are not satisfactory for the reason, as we believe, that the particles of the coloring matter (dye or pigment) under these conditions do not cover or coat the particles of the comminuted parasiticide. In fact we have found by direct observation of such materials under the microscope that in many instances the particles of the coloring matter appear larger than the particles of the comminuted parasiticide and furthermore that the coloring matter seems to be segregated and not attached to the particles of the parasiticide, the result being that the objectionable color of the normal parasiticidal material is not satisfactorily masked by the coloring matter under these circumstances.

We have made the further discovery that the peculiar sulphur composition formed by bringing melted sulphur or sulphur vapor into intimate contact with bentonite clay and then solidifying the fluid sulphur in situ in the bentonite in accordance with the method described and claimed in United States Patent No. 1,550,650 to Henry W. Banks, 3rd, may be colored with a dye or pigment in accordance with our invention. Thus for instance the sulphur in Example I or a portion thereof may be replaced by the bentonite sulphur composition just referred to above without adversely affecting the color of the resulting product and at the same time the toxicity of the sulphur content of the finished material is substantially increased by this procedure.

This application has been divided and a co-pending application filed on November 11, 1933, the serial number of which is 697,692, claiming certain subject matter disclosed in this application but not claimed herein.

We claim:—

1. A parasiticidal composition for application to the foliage of plants to control the parasitic diseases thereof comprising a pulverulent insoluble parasiticide the particles of which are colored with a substantially insoluble colored coating possessing a color or tint substantially the same in appearance to the eye as that of the foliage to which the composition is applied, the said coating comprising a colored substance and a dye carrier.

2. A parasiticidal composition comprising a pulverulent insoluble parasiticide the particles of which are substantially covered with a coating comprising a substantially insoluble colored colloidal substance.

3. A parasiticidal composition comprising a pulverulent insoluble parasiticide the particles of which are substantially covered with a coating comprising a substantially insoluble colored gelatinous substance.

4. A parasiticidal composition comprising a pulverulent insoluble parasiticide the particles of which are substantially covered with a coating comprising a substantially insoluble dyed gelatinous bentonite clay.

5. A parasiticidal composition comprising a pulverulent insoluble parasiticide the particles of which are substantially covered with a coating comprising a substantially insoluble dyed gelatinous bentonite clay and casein.

6. A parasiticidal composition comprising a pulverulent insoluble parasiticide the particles of which are substantially covered with a coating comprising a substantially insoluble dyed gelatinous clay and ammoniated casein.

7. In the method of coloring a pulverulent insoluble parasiticide by means of a dye the step which comprises suspending the comminuted parasiticide in water in intimate contact with the dye and a dye carrier capable of precipitating the dye in substantially insoluble form upon the particles of the comminuted parasiticide.

8. A pulverulent parasiticidal composition for application to the foliage of plants to control the parasitic diseases thereof comprising sulphur solidified in situ in bentonite clay, the particles of the bentonite containing the solidified sulphur being coated with a substantially insoluble colored material and the composition as a whole being further characterized by possessing a color substantially the same in appearance to the eye as that of the foliage to which the composition is to be applied.

9. A parasiticidal composition comprising pulverulent sulphur, the particles of which are coated with a substantially water-insoluble coating comprising a dye and a dye carrier and the composition as a whole being further characterized by possessing a green color substantially the same in appearance to the eye as the color of normal foliage leaves of the rose plant.

10. A parasiticidal composition comprising pulverulent sulphur, the particles of which are coated with a substantially water insoluble coating comprising a dye and a dye carrier the composition as a whole being further characterized by possessing a green color substantially the same in appearance to the eye as the color of normal foliage leaves of golden Ophelia rose when the particles of the composition possess a degree of fineness such that at least about 90% of them are passed through the 100 mesh screen and when the composition is dusted on the foliage at the rate of about 9 lbs. per square foot of leaf surface.

MAX L. TOWER.
HARRY W. DYE.